US006633555B1

United States Patent
Lin et al.

(10) Patent No.: US 6,633,555 B1
(45) Date of Patent: Oct. 14, 2003

(54) SYSTEM AND METHOD FOR MONITORING SIGNALING UNITS ON A-INTERFACE LINKS IN A GSM NETWORK

(75) Inventors: Lisan Lin, Carrollton, TX (US); Xingchen Lu, Richardson, TX (US); Vijayakumar Venkataraman, Plano, TX (US); Xin Miao, Plano, TX (US)

(73) Assignee: Inet Technologies, Inc., Plano, TX (US)

( * ) Notice: Subject to any disclaimer, the term of this patent is extended or adjusted under 35 U.S.C. 154(b) by 0 days.

(21) Appl. No.: 09/156,327

(22) Filed: Sep. 18, 1998

(51) Int. Cl.[7] ............................................. H04M 15/04
(52) U.S. Cl. ...................................... 370/331; 455/436
(58) Field of Search ................................. 370/328, 331, 370/337, 338, 347; 455/445, 436, 439, 432

(56) References Cited

U.S. PATENT DOCUMENTS

| | | | | |
|---|---|---|---|---|
| 5,423,065 A | * | 6/1995 | Pinard | 455/51.1 |
| 5,438,570 A | | 8/1995 | Karras et al. | 370/94.2 |
| 5,712,908 A | | 1/1998 | Brinkman et al. | 379/119 |
| 5,845,211 A | * | 12/1998 | Roach | 455/436 |
| 5,884,175 A | * | 3/1999 | Schiefer et al. | 455/436 |
| 6,028,914 A | * | 2/2000 | Lin et al. | 379/14 |
| 6,081,715 A | * | 6/2000 | La Porta et al. | 455/445 |
| 6,119,000 A | * | 9/2000 | Stephenson et al. | 455/432 |
| 6,249,572 B1 | * | 6/2001 | Brockman et al. | 379/133 |

* cited by examiner

Primary Examiner—Steven Nguyen
Assistant Examiner—Duc Duong
(74) Attorney, Agent, or Firm—Fulbright & Jaworski LLP (57) ABSTRACT

A system and method for correlating messages from A interface links is disclosed. When an initial connection message for a new call connection is detected, a new anchor record and call record are created to capture messages for that call. When an initial handover connection is detected, a handover pending record is created to collect messages related to the handover connection. When either a handover-from or handover-to connection is detected, a handover connection reference record is sent to a rendezvous processor. Handover-to and handover-from connection reference records are correlated in the rendezvous processor by matching data keyed to the specific handover event. Once a handover pending record is paired to an existing anchor record, the handover pending record is converted to a routing record to route messages to the anchor record. If the handover pending record is not paired with an existing anchor record, then it is converted to an anchor record and a new call record is created to collect messages for the handover-to connection. All messages for a particular call on an MSC are correlated from each A interface in to a single call record. The A interface call record is then further correlated with other call and transaction records by a central server or processor.

21 Claims, 5 Drawing Sheets

SYSTEM AND METHOD FOR MONITORING SIGNALING UNITS ON A-INTERFACE LINKS IN A GSM NETWORK

TECHNICAL FIELD OF THE INVENTION

The present invention is related to capturing messages in a signaling network, and more particularly, to capturing and correlating messages from an A interface in a GSM network.

BACKGROUND OF THE INVENTION

The Global System for Mobile Communications (GSM) is the standard for a second generation cellular system. Although it was initially developed as a common mobile communications system in Europe, GSM systems are now deployed world-wide. The GSM standards, which specify network level architectures and services, are set by the European Technical Standards Institute (ETSI). In a GSM system, Mobile Stations (MS) communicate with a Base Station Subsystem (BSS) via a radio interface or air interface "Um". BSSs are connected to Mobile Switching Centers (MSC) through an "A" interface, which may be embodied as dedicated or leased wirelines or a microwave link.

The GSM BSSs are comprised of a number of Base Transceiver Stations (BTS) each coupled to a single Base Station Controller (BSC). The Um air interface exists between the BTSs and the individual MSs. The interface between a BTS and the BSC is designated the Abis interface. The BSS is responsible for channel allocation, power control, signaling, handover initiation and other functions. The MSC functions include handover control, MS location updating and paging. MSCs also provide a gateway to other networks, such as the Public Switched Telephone Network (PSTN), Integrated Services Digital Network (ISDN) and packet data networks.

The A interface has a well defined protocol in the GSM system so that service providers and network operators can connect BSSs and MSCs from different manufacturers for use in the same system. The A interface uses the Signaling System No. 7 (SS7) Signaling Correction Control Part (SCCP) protocol to support communication between the MSC and the BSs and between the MSC and the MSs. The signaling protocol on the A interface consists of three layers. The first layer, or the Physical Layer, is a digital trunk. The digital trunk is coupled to a traffic channel on the Um air interface to convey speech and data between the MSC and MS. The Data Link Layer (Layer 2) consists of the Message Transfer Part Level 2 (MTP2) of SS7. MTP2 provides reliable transfer of signaling messages between the MSC and BS. The Message Layer (Layer 3) consists of the Base Station Subsystem Application Part (BSSAP).

BSSAP uses the SCCP protocol and consists of two parts: the Direct Transfer Application Part (DTAP) and the BSS Management Application Process (BSSMAP). At a BSS, DTAP transparently transfers Mobility Management (MM) messages and Connection Management (CM) messages between the MSC and MSs. The DTAP messages are not processed by the BSS. MM messages support MS location updating and authentication. CM messages support Call Control, Supplementary Services and Short Message Service (SMS). The Call Control sublayer contains messages for the set-up and release of connections to the MS. SMS allows users to send short text messages to the MS for display to the subscriber. BSSMAP messages relate to communications between the MSC and the BSC, such as Radio Resource management (RR) messages. The BSSMAP messages support all of the procedures between the MSC and the BSS, such as resource allocation, paging, handover, and release.

The GSM mobiles, or Mobile Stations (MSs), consist of two parts: the Mobile Equipment (ME) and the Subscriber Identify Module (SIM). The ME comprises the transmitter, receiver, keypad, microphone, speaker, etc. The SIM is a smart card that stores information about the ME user. The SIM can be used with any ME and the ME is operable only when the SIM is inserted. An MS is uniquely identified by its International Mobile Station Identity (IMSI). The IMSI identifies both a Public Land Mobile Network (PLMN) selected by the user for mobile service and a specific MS within the PLMN. The IMSI is assigned by the PLMN service provider and is stored in permanent memory on the SIM. MSs are also identified by a Temporary Mobile Station Identity (TMSI). A TMSI uniquely identifies the MS within a location area of a PLMN using a 32-bit binary number. Location areas consist of a number of adjacent cells in a PLMN. The TMSI is stored in temporary memory on the SIM. TMSIs provide protection against fraudulent use of MS identities because an intercepted TMSI does not identify the MS after it has left a location area. Most messages identify the MS by a TSMI and a Location Area Identity (LAI).

Related, co-pending application Ser. No. 09/092,771, filed Jun. 5, 1998, which issued as U.S. Pat. No. 6,411,604 on Jun. 25, 2002, entitled SYSTEM AND METHOD FOR CORRELATING TRANSACTION MESSAGES IN A COMMUNICATIONS NETWORK, discloses a monitoring system for capturing and correlating all of the messages for a single transaction in a communication or signaling network, such as an SS7 network. Other applications, including application Ser. No. 09/057,940, entitled SYSTEM AND METHOD FOR MONITORING PERFORMANCE STATISTICS IN A COMMUNICATION NETWORK, filed Apr. 9, 1998, which was issued as U.S. Pat. No. 6,028,914 on Feb. 22, 2000; application Ser. No. 09/092,699 entitled SYSTEM AND METHOD FOR SIGNAL UNIT DATA STORAGE AND POST CAPTURE CALL TRACE IN A COMMUNICATIONS NETWORK, filed Jun. 5, 1998; application Ser. No. 09/093,824 entitled TRANSACTION CONTROL APPLICATION PART (TCAP) CALL DETAIL RECORD GENERATION IN A COMMUNICATION NETWORK, filed Jun. 8, 1998, which issued as U.S. Pat. No. 6,249,572 on Jun. 19, 2001; and application Ser. No. 09/093,955 entitled SYSTEM AND METHOD FOR MONITORING SERVICE QUALITY IN A COMMUNICATION NETWORK, filed Jun. 8, 1998, which issued as U.S. Pat. No. 6,381,306 on Apr. 30, 2002, also disclose systems and methods for capturing and correlating call and transaction messages in a communication network. These applications are commonly assigned and hereby incorporated by reference herein.

It is known in the prior art for monitoring systems to be coupled to the communication links in a wireline network. The monitoring systems disclosed in the prior art capture the Signaling Units (SU) and messages that pass across the communication link. The systems then correlate the call and transaction messages captured from various links into call and transaction records. System operators can access these records to monitor calls or transactions for particular subscribers or to troubleshoot network problems. The call and transaction records can also be used to generate network and performance statistics. However, the prior art does not teach a system or method for capturing and correlating messages from the links between components in a wireless network. In the case of a wireless network, such as a GSM network, the prior art methods of correlating call or transaction messages will not work because a MS may change BTSs, BSCs, and even MSCs during the course of a single call as the MS moves from one cell to another. Accordingly, there is a need in the art for a system and method in which all of the messages that are related to a single GSM call can be captured and correlated into a single record.

It is an object of the present invention to capture all of the signaling units from the A interfaces for an MSC and to correlate messages that belong to a single mobile call into a call record.

It is a further object of the present invention to correlate messages for a single call as the call is handed over among two or more BSCs served by the MSC.

It is another object of the present invention to correlate mobile call messages captured from A interface links with related call and transaction messages that are captured on other communication links.

It is another object of the present invention to correlate messages based on SCCP connections.

SUMMARY OF THE INVENTION

These and other objects, features and technical advantages are achieved by a system and method which correlates signaling units captured from A interface links in a GSM network so that all messages for a particular call, including messages on different A interface links due to handover, are combined into a single call record.

Monitoring units capture messages from all of the communications links of an MSC, including the A interface links between the MSC and various BSCs. The captured messages are routed by link processors to call, transaction and A interface processors based upon the message type. A interface processors create an Anchor Transit Record and a Call Record upon detecting the initial message for a new call connection. Any messages having the same Originating Point Code (OPC) and Source Connection Reference number as the initial call connection message are added the Call Record by the Anchor Transit Record. A Secondary Transit Record is created using the response to the initial call connection message. The Secondary Transit Record routes all messages for the call to the Anchor Transit Record, which adds the messages to the Call Record.

When a call is handed over to a new BSC, a Handover Pending Transit Record is created. The Handover Pending Transit Record is promoted to either a Handover Router or an Anchor Transit Record depending upon whether or not the handover connection can be coordinated with another A interface connection having an existing Anchor Transit Record. Handover Connection Records are created when an existing A interface call is handed over or when a new A interface call connection is initiated for a hand over call. If the Handover Connection Records are correlated by a rendezvous processor, then the Handover Pending Transit Record is promoted to a Handover Router and it routes all related messages to the original Anchor Transit Record for the handover-from connection. The original Anchor Transit Record is promoted to a Handover Anchor Transit Record and it adds all messages from both the handover-from and handover-to sides of the connection. Eventually the connection on the handover-from side is torn down and the Secondary Transit Record is destroyed because it is no longer needed.

On the other hand, if the connection on the handover-from side was associated with a different MSC, then the Handover Connection Record will not be correlated by the rendezvous processor and the Handover Pending Connection Record will be promoted to a new Anchor Transit Record. A new Call Record will also be created to collect the messages for the handover-to connection.

Additional Handover Pending and Handover Router Transit Records will be created as the call is handed over to other A interfaces. The Handover Anchor Record continues to route messages to the Call Record as long as the connection is maintained by the MSC. When the call is terminated or when the call connection moves to another MSC, the Handover Anchor Record is terminated and the Call Record is passed to a central server, or other device, for additional processing in real-time while the call continues on the second MSC.

The central server may correlate the completed A interface Call Record to A interface Call Records for the same or other MSCs. Additionally, the completed A interface call record may be correlated to other call and transaction records from other networks to create a global call record which includes all of the call and transaction messages for a particular call.

It is a feature of the present invention to capture all of the messages from the A interfaces of an MSC in a GSM network. A single monitoring unit is coupled to each A interface link so that messages belonging to a particular call may be captured from each A interface.

It is another feature of the present invention to maintain an anchor record for routing messages to a call record using the primary OPC and source connection reference for messages.

It is a further feature of the present invention to maintain a secondary record for routing certain messages to the anchor record using the alternate point code and source connection reference for messages.

It is another feature of the present invention to create a handover pending record when a new handover connection is detected on an A interface link. If the new handover connection is correlated to an existing anchor record, then messages for the handover connection are routed to the anchor record by converting the handover pending record to a handover routing record. If the handover connection is not correlated to an existing anchor record, then the handover pending record is converted to a new anchor record.

It is a feature of the present invention to correlate all messages related to a specific call into a single call record without regard to which A interface the message is detected on by using the cell identifier and handover reference number carried in certain messages.

It is an additional feature of the present invention to correlate a connection on a first A interface with a connection on a second A interface by using handover connection reference records comprising information that identifies a specific handover event.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying put the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
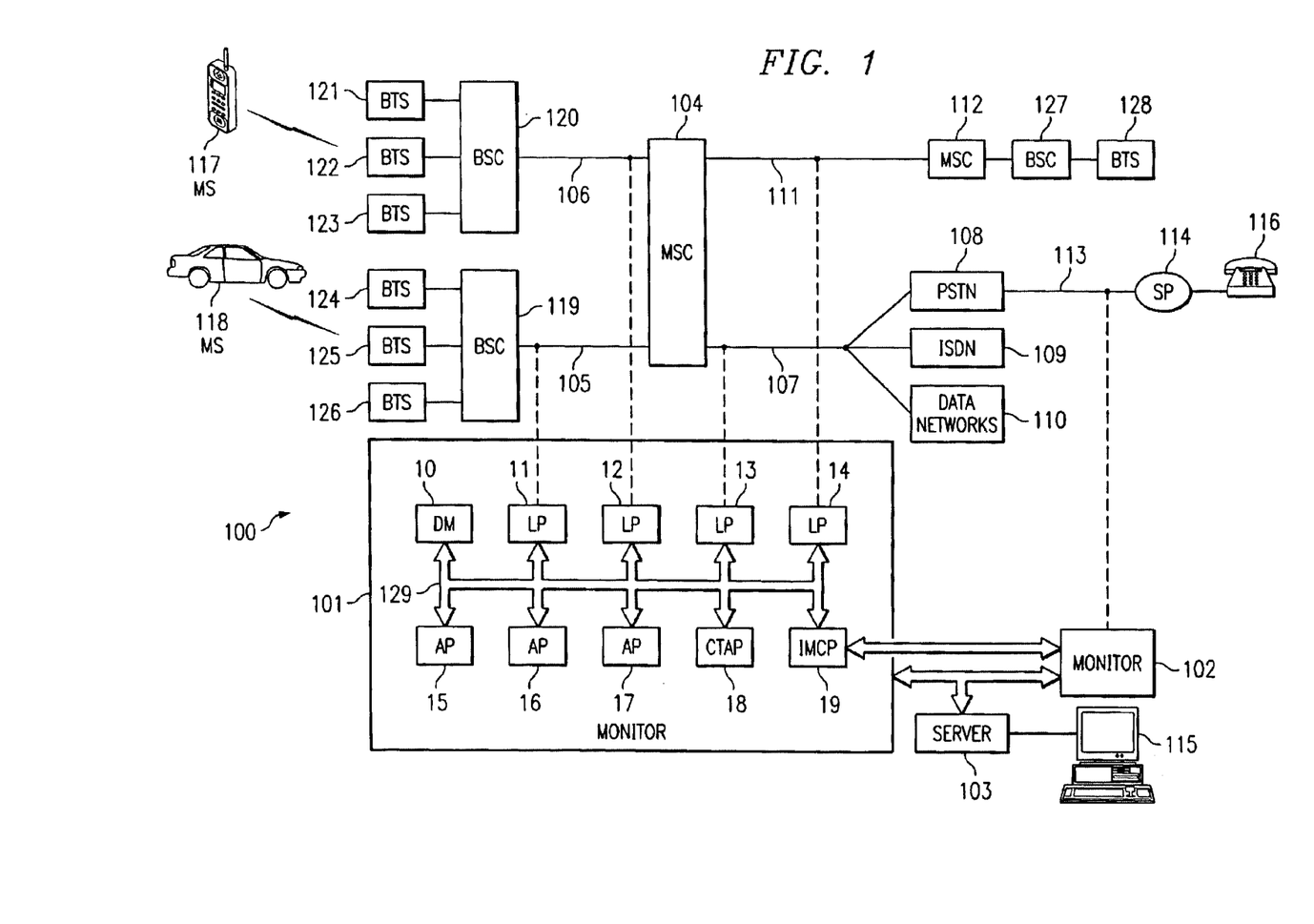
FIG. 1 is a block diagram of an A interface monitoring unit coupled to components of a GSM network.

FIG. 1 shows monitoring system 100 in which Monitor 101 and Monitor 102 are coupled to communication networks. Monitors 101 and 102 are also coupled to a common Server 103. Monitor 101 monitors all of the signaling links attached to MSC 104 in order to capture the messages passing to or from MSC 104. In a similar manner, Monitor 102 is coupled to communication links in a wireline network, including link 113 between PSTN 108 and Signaling Point 114. Monitor 102 captures all of the Signaling Units (SU) and messages that pass across link 113. As disclosed in co-pending application Ser. No. 09/092,771, Monitor 102 and monitoring system 100 are capable of correlating all call and transaction messages on the communications network associated with SP 114 into individual call and transaction records. These records may be correlated and stored on Monitor 101, Server 103, or both. System operators can access these records using workstation 115. Operators can search for and/or monitor calls or transactions for particular subscribers, such as user 116. Server 103 is also capable of generating network and performance statistics from the call and transaction records.

In Monitor 101, Link Processors (LP) 11–14 receive SUs and messages from the communication links connected to MSC 104. LPs 11 and 12 receive SUs from A interfaces 105 and 106, respectively. LP 13 receives SUs from links 107 between MSC 104 and PSTN 108, ISDN 109 and Data Networks 110. LP 14 captures SUs from link 111 between MSC 104 and MSC 112. It will be understood that Monitor 101 is capable of capturing SUs from any number of additional communication or signaling links (not shown) for MSC 104 so that LPs 11–14, or other processors, will detect all of the SUs and messages passing into, or out of, MSC 104. LPs 11–14 may receive messages from a single link or from multiple links.

MSs 117 and 118 initiate and receive calls through BTSs 121–126, which are controlled by BSCs 119 and 120. MSC 104 controls BSCs 119 and 120 via A interfaces 105 and 106. MSC 104 exchanges messages with BSCs 119 and 120, and with MSs 117 and 118, via A interfaces 105 and 106. Accordingly, all of the messages related to calls for MSs 117 or 118 can be captured from A interface 105 or 106 by Monitor 101.

In the illustrative embodiment described herein, monitoring system 100 tracks calls on a per mobile call per MS per MSC basis to provide information including the SUs for the call, MS identification, type of call, and duration of call. A record is generated for each call that is initiated by an MS. Calls initiated by an MS are referred to as Mobile Originating Calls (MOC) herein. Records are also generated for each call that terminates at an MS, these are referred to as Mobile Terminating Calls (MTC). For calls in which each party is an MS, such as a call from MS 117 to MS 118, two records will be created: a MOC record for MS 117 and a MTC record for MS 118. Calls between two MSs are referred to as Mobile Originating Terminating Calls (MOTC). Two separate records are created in this situation because Monitor 101 tracks messages at the A interface level. Therefore, Monitor 101 will see the MOC messages for MS 117 on A interface 106 and messages for the MTC part of the call to MS 118 will be detected on A interface 105.

Individual A interface call records can then be further correlated with other associated records, such as other A interface call records, or other call and transaction records. All such records can be correlated into a complete, global record comprising the messages for each leg of a call. For example, in the case of a call between user 116 and MS 117, Monitor 101 will generate call records both for the messages on A interface 106 and for messages on link 107. Furthermore, Monitor 102 will generate call records for messages on link 113 and for messages that are captured on other links in PSTN 108. These various call records may be forwarded to Server 103 or to some other device, such as one of the Monitors 101, 102, where the component call records are combined into a complete call record containing all of the messages or signaling units corresponding to the call.

In the case of a wireless network, handover among various cells presents an additional problem when Monitor 101 is correlating messages, such as SCCP messages. Using MS 117 as an example, during the course of a mobile call there may be an intra-BSC 120 handover among BTSs 121–123 as MS 117 changes location and moves from one BTS cell to another. For these intra-BSC handovers, messages between MS 117 and MSC 104 continue to pass across A interface 106. Alternatively, there may be an inter-BSC handover as MS 117 moves from a BTS controlled by BSC 120, such as BTS 123, to a BTS controlled by BTC 119, such as BTS 124. In the case of an inter-BSC handover, messages for one part of a call will pass across A-interface 106 and messages for another part of the same call will pass across A interface 105. In the present invention, Monitor 101 detects such inter-BSC handovers and correlates all of the messages for the call into a single record. This type of inter-BSC handover is also an intra-MSC handover, since the call connection continues for the same MSC.

An additional level of complexity is added when there is an inter-MSC handover. For example, if MS 117 moves from a cell served by BTS 121 to a cell served by BTS 128, then messages will no longer pass across A interface 106. Instead, MSC 112 will become responsible for the call and messages will pass from MSC 112 to BTS 128 through BSC 127. The original MSC (104) will become the anchor MSC and an Integrated Services User Part (ISUP) call setup procedure occurs just before MSC 112 takes responsibility for the call to MS 117. A monitor (not shown) assigned to MSC 112 will capture and correlate the messages passing from MSC 112 to MS 117 after the inter-MSC handover. To create a complete, global call record, the call leg components, such as the records for the MSC 104 and the MSC 112 portions of the call, must be correlated. In one embodiment this correlation of related call records is accomplished by Server 103, which receives completed A interface, call and transaction records from each monitor in system 100.

It will be understood that the present invention is also capable of correlating messages for a Subsequent Inter-MSC Handover. For example, in the case of a land line call to a mobile MS that is being served by MSC A, the mobile MS may cross a boundary, such as by moving from one country to another, so that a handover must be made to a second MSC B. In order to maintain the call to the MS during the inter-MSC handover, MSC A must set up a circuit to MSC B. As a result, the call will pass from MSC A to MSC B and from MSC B to the MS. If the MS moves into another area served by MSC C, then there will be a subsequent inter-MSC handover and a circuit will be set up between MSC B and MSC C. Alternatively, if the MS returns to the area served by MSC A, then there is a subsequent inter-MSC handover and the circuit between MSC A and MSC B will be broken so that MSC A can again take over the call.

In FIG. 1, Monitor 101 captures all of the messages for MSC 104 and correlates those messages using the A interface tracking process described in detail below. LPs 11–14 receive messages that are captured from MSC 104's communications links and route the messages to the appropriate processor 15–19 as directed by Distribution Manager (DM) 10. Monitor 101 comprises a number of processors 15–18 each capable of processing call, transaction and/or A interface messages. DM 10 monitors the messages received by LPs 11–14 and directs how the LPs should route the messages. The messages are routed by DM 10 so that a balanced load is maintained across message processors 15–18. Messages are routed among processors 11–19 via bus 129.

In the example shown in FIG. 1, processors 15–17 have been designated as A interface processors (AP) by DM 10. Processor 18 may be designated as a call, transaction or A interface processor depending upon Monitor 101's need to process additional call, transaction or A interface messages. DM 10 can also redesignate AP 15–17 to process call and transaction messages in addition to, or instead of, A interface messages. As described in related application Ser. No. 09/092,771, Inter-Monitor Communications Processor (IMCP) 19 couples Monitors 101 to other monitors, such as Monitor 102, so that messages can pass to among the monitors.

In a preferred embodiment, a single monitor is assigned to each MSC. For example, all the links for MSC 104 are monitored by Monitor 101. Accordingly, Monitor 101 will detect all of the messages passing to or from MSC 104 across A interfaces 105 and 106. Individual monitors may be assigned to more than one MSC, however, two different monitors are not assigned to the same MSC. Therefore, there is no need to pass A interface SUs among various monitors, since the A interface messages are correlated into a complete record by processors within a single monitor.

As discussed above, in a GSM system the A interface uses SCCP messages for signaling between the MSC and the BSC. SCCP connections are associated in part by use of Connection Reference Numbers. During the existence of a connection, a Connection Reference Number is guaranteed to be unique relative to the device that generates the number. However, the reference number may be reused following a freezing period after the connection is released. Connection-oriented messages may use one, or both, of two Connection Reference Numbers, one for each end of the connection. The assigned AP, 15–17, designates one Connection Reference Number as the primary reference number and the other as the alternate reference number. DM 10 and LPs 11–14 use the primary Connection Reference Number as a key for initial message distribution of the captured messages. Each new Connection Reference Number is assigned to a particular AP 15–17 by DM 10 and all future messages having that Connection Reference Number during the duration of the call are routed to the assigned AP. APs 15–17 rely on the Connection Reference Numbers for the A interface message association logic.

A Call Record in the present invention may be embodied as an object class defined to represent mobile calls with a many to one relationship. An A interface Call Record consists of correlated information, such as SUs, type of call, and duration of call, as monitored at the A interface, in a per mobile call per MS per MSC basis. In the event of an inter-BSC/intra-MSC handover, SUs of the handover-to connection are routed to the A interface Call Record associated by the initial connection for the call, or the handover-from connection.

The A interface messages are correlated into three types of call records by APs 15–17: Mobile Termination Call Records, Mobile Origination Call Records or MSC Handover Call Records. With the exception of Mobile Termination Call Records, all A interface Call Records contain only SCCP connection oriented DTAP or BSSMAP messages or SUs. A Mobile Termination Call Record may contain an additional connectionless BSSMAP Page message at the head of its SU list. In the event of an inter-BSC handover, SUs for the new BSC are routed to the Call Record associated with the initial connection for the call, which may be a Mobile Termination Call Record or a Mobile Origination Call Record. For an inter-MSC handover, a MSC Handover Call Record is created for the handover-to connection.

Figure 2:
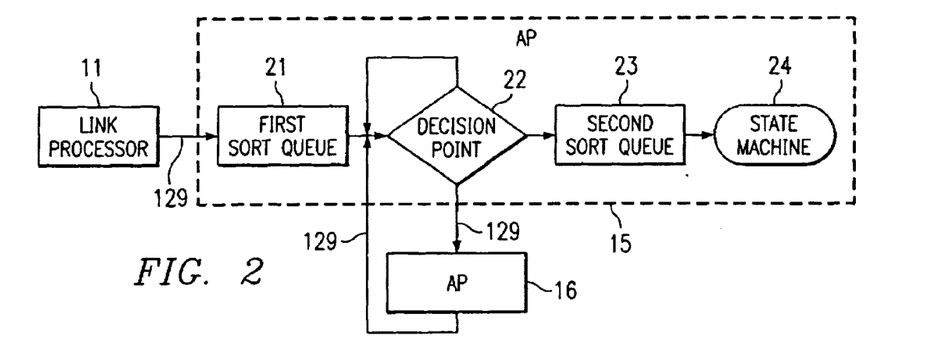
FIG. 2 is a flow chart illustrating the flow of signaling units in the present invention.

The A interface association logic provided by APs 15–17 is based on the decision point concept illustrated in FIG. 2, wherein like numbered elements correspond to elements of FIG. 1. AP 15 is assigned to process messages for a particular mobile call. Link processors, such as LP 11, forward all messages for a call to a designated AP, such as AP 15, using the Connection Reference Number. As AP 15 receives messages, they are sorted into time order in First Sort Queue 21 and then passed to Decision Point 22. If the link processors route messages to another AP, such as AP 16, then AP 16 can forward the messages to the correct AP via bus 129. Decision Point 22 ensures that only messages that are assigned to AP 15 are allowed to pass on to Second Sort Queue 23 and to State Machine 24 for further processing. All other messages are routed back to Decision Point 22 to be processed using the alternate Connection Reference Number, routed to another AP over bus 129, or simply ignored.

AP 15 defines an A interface Call Record for each assigned call. In order to route messages to the appropriate Call Record on the appropriate processor, APs 15–17 create one or more Transit Records. The Transit Records have a many to one relationship to the Call Record, such that an A interface Call Record is assisted by one or more Transit Records, but a Transit Record cannot assist more than one Call Record. Transit Records are classified by their permitted lifetime and by the keys they use to route messages. Since the purpose of the Transit Records is to assist in associating messages for a specific call, their existence is only significant during the lifetime of the call they are trying to assist. Transit Records are destroyed at the termination of the associated call connection. This also ensures consistency and stability in the A interface call tracking subsystem due to limited uniqueness of the Connection Reference Numbers. To assist in clearing the Transit Records after the call is completed, APs 15–17 define a Transit Record as either long-lived or short-lived. Complications such as MS handovers among cells and connectionless Page messages make it possible that several Transit Records may be needed on different APs for a single call. However, the association logic used in the preferred embodiment ensures that a Call Record is assigned a maximum of three long-lived Transit Records at any time. The remaining Transit Records must be short-lived.

In a preferred embodiment, devices such as processors 10–19, Monitors 101–102, Server 103 and Workstation 115 each utilize software instructions for processing captured signaling units, and for maintaining Transit Records and Call Records. The software instructions may be resident in a memory on the devices, or the instructions may be loaded from one device onto another device when a specific function must be performed. For example, specific software instructions are used to route captured messages to assigned processors, to process the messages, to create and maintain Transit Records, to add messages to Anchor records and to associate call connections during a handover.

The duration of the short-lived Transit Record is defined in a configurable parameter that is set on system start-up. Typically, the short-lived duration parameter is set to a few seconds. A short-lived Transit Record will be purged by a time-out mechanism when its lifetime expires. A long-lived Transit Record usually has a lifetime equivalent to the duration of the connection, or the Call Record, to which it is associated. Association logic ensures that all of the associated long-lived Transit Records are deleted when a Call Record is closed.

Different types of Transit Records use different keys. To allow optimal search efficiency, a form of data polymorphism is employed in defining the various Transit Record keys such that all Transit Records can be maintained by the same table, for example, in a hash table. Valid Transit Record keys include: Connection Key (ConnKey), Handover Anchor Key (HoAnchorKey), Page Key (PageKey) and Handover Reference Key (HoRefKey). A ConnKey uniquely identifies a particular SCCP connection. ConnKey is defined as an Originating Point Code (OPC)/Source Connection Reference (SourceConnRef) pair or a Destination Point Code (DPC)/Destination Connection Reference (DestConnRef) pair. The HoAnchorKey uniquely identifies an anchor Transit Record after an MS handover, it is defined as the anchor Transit Record's address. The PageKey uniquely identifies the Page message for a mobile termination call. The PageKey contains the IMSI or TMSI for the MS. HoRefKey is used to identifies two separate A interface connections for the same call during a handover. The HoRefKey contains a cell identification and a handover reference number for the BTS to which the call is being handed over.

The various types of Transit Records are defined as follows:

Anchor Record

An Anchor Record uses a ConnKey and is long-lived. An Anchor Record represents the originating end for the first connection of a mobile call in a GSM network. It provides the anchor point to which all SUs of the call should be routed. An Anchor Transit Record has a bidirectional association relation with its Call Record. Usually, its duration equals the lifetime of the first connection of the Call Record. An Anchor Record can be created in one of two ways, either by the first SCCP Connection Request (CR) message of the first connection of a Mobile Termination Call Record or a Mobile Origination Call Record or, in the case of inter-MSC handover, by promotion of an HoPending Transit Record. The HoPending Transit Record is discussed in more detail below. The Anchor Transit Record is keyed off of the OPC/SourceConnRef pair for the first connection of the call.

Handover Anchor (HoAnchor) Record

An HoAnchor uses an HoAnchorKey and is long-lived. The HoAnchor represents an anchor point for the Call Record after the first inter-BSC handover for the call. The HoAnchor and Anchor are structurally identical and functionally similar in their roles as anchor point for their associated Call Record. In operation, an Anchor will promote itself to an HoAnchor following an inter-BSC handover. Upon closing of the first connection of a call in an inter-BSC handover, the Anchor Transit Record will become an HoAnchor by changing its type and its identity. The change from Anchor to HoAnchor Transit Record is required to prevent errors that will arise from the reuse of the Connection Reference Numbers. The SS7 SCCP protocol specifies that the Connection Reference Numbers may be reused for a new call after a freezing period following the end of a previous call having the same Connection Reference Number. There is a finite set of Connection Reference Numbers, so they must be made available for reuse in future calls. The freezing period is used to prevent overlap between calls having the same Connection Reference Number. All SUs for the new MSC-BSC connection following handover are be routed to the HoAnchor. Usually, an HoAnchor exists until its associated Call Record is closed. The HoAnchorKey is keyed off the address of the Call Record to guarantees its uniqueness.

The ATP call association logic is complicated by the inter-BSC and inter-MSC handover scenarios. The present invention employs a handover rendezvous mechanism using a HoRefKey embedded in the Handover Command message. In the case of an inter-MSC handover, the call is split into two Call Records, one record on both of the probes assigned to the MSCs. In the case of inter-BSC handover, the two connections are correlated into one Call Record in such a manner that SUs for the handover-to BSC are all routed to the AP processor that is handling the handover-from Call Record. To prevent difficulties in cleaning up long-lived Transit Records upon closing of a Call Record, the association logic guarantees a maximum of three long-lived Transit Records per Call Record.

During handover the connections between an MSC and a first BSC and between the MSC and a second BSC will coexist for a short time. This may cause an ambiguous SU flow in State Machine 24 if the messages are processed in time order. To prevent this situation, the call association logic ensures that messages are ordered first by connections and then by time.

Secondary Record

Secondary Transit Records use the ConnKey and are long-lived. Secondary Transit Records represent the responding end of the first call connection. The main function of the Secondary Transit Record is to assist SU association at the connection level by routing messages to the Transit Record representing the originating end of the connection, such as an Anchor or HoAnchor Transit Record. Usually the Secondary Transit Record lifetime equals the lifetime of the connection it represents. Secondary Transit Records are created by the SCCP Connection Confirmation (CC) message for the call connection and is keyed off the OPC/SourceConnRef pair for the CC message.

Handover Pending (HoPending) Record

The HoPending Transit Record uses the ConnKey and is short-lived. HoPending Transit Records represent the originating end of a handover-to connection before the nature of the handover (i.e. inter-MSC or inter-BSC) is determined. The HoPending Transit Record temporarily queues up SUs until the processor determines the nature of the handover. If the handover is inter-BSC, then the HoPending Transit Record will promote itself to an HoRouter. On the other hand, if the handover is inter-MSC, then the HoPending Transit Record will promote itself to an Anchor Transit Record. The HoPending Transit Record is created by the SCCP CR message for a handover-to connection and is keyed off the OPC/SourceConnRef pair of the CR message.

Handover Router (HoRouter) Record

An HoRouter Transit Record uses the ConnKey and is long-lived. The HoRouter Transit Record represents the originating end of a handover-to connection after a handover has been determined to be of the inter-BSC type. The HoPending Transit Record is promoted to HoRouter after a successful rendezvous or correlation of two handover connections. The duration of the HoRouter Transit Record is the lifetime of the call connection it represents. HoRouter is keyed off the OPC/SourceConnRef pair of the CR message of the handover-to connection.

Handover Reference Connection (HoRefConn) Record

The HoRefConn Transit Record uses the HoRefKey and is short-lived. HoRefConn Records represent the rendezvous of a possible inter-BSC handover. An HoRefConn Transit Record is created either by the handover-to or the handover-from connection during an inter-MSC or inter-BSC handover. The HoRefConn is keyed off the Handover Reference Number and the Cell Identifier data fields in the Handover Command message. The successful rendezvous of two handover connections through mapping of this unique HoRefKey will trigger the promotion of HoPending to HoRouter for the handover-to connection and the promotion of the Anchor to HoAnchor for the handover-from connection.

Page Pending Record

The Page Pending Transit Record uses the PageKey and is short-lived. Page Pending Transit Records are created for Mobile Terminating Calls upon detection of the initial Page message. The Page message is a connectionless SCCP BSSMAP message that is sent to all of the BTS by the MSC in order to initiate a call to an MS. The Page Pending Transit Record is used to assist in associating the Page message with the appropriate Anchor Transit Record. The Page message is attached to the call's Anchor Transit Record when the transit record is created for the call. The Page Pending Transit Record is keyed off either the IMSI or TMSI data field in the Page message.

Figure 3:
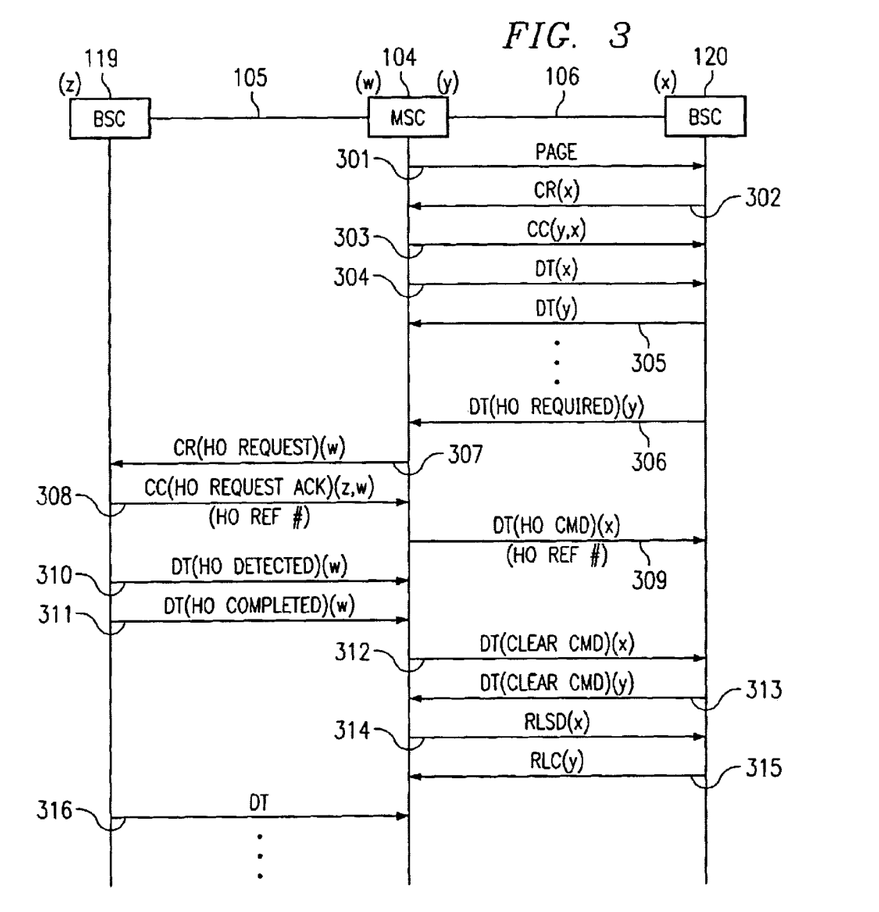
FIG. 3 is a bounce diagram illustrating the messages exchanged between the MSC and BSC during a Mobile Originating Call.

Turning now to FIG. 3, the messages that are exchanged between MSC 104 and BSC 120 across A interface 106 and between MSC 104 and BSC 119 across A interface 105 during a mobile call. The example call is a Mobile Terminating Call in which MSC 104 receives an incoming call to be routed to an MS. MSC 104 determines that BSC 120 is in communication with the MS and sends connectionless Page message 301 to the MS through BSC 120. Page 301 includes identifying data such as the TMSI or IMSI for the called MS. Once the MS receives Page 301, it responds through BSC 120 with Connection Request (CR) message 301 to initiate a mobile call connection. CR 301 comprises Source Connection Reference (x), which uniquely identifies the connection for BSC 120. CR 301 also comprises the TMSI or IMSI for the called MS.

In response, MSC 104 sends Connection Confirm (CC) message 303 to BSC 120. CC 303 comprises both Source Connection Reference (y), which uniquely identifies MSC 104 for the connection, and Destination Connection Reference (x). A number of BSSMAP and DTAP Data messages (DT), such as DT 304 and 305, are exchanged to complete the call connection and to set up a voice channel between the called MS and MSC 104. The DT messages typically contain the Destination Connection Reference information, but do not carry the Source Connection Reference data. Messages continue to be exchanged between MSC 104 and BSC 120 until the call is complete or until the call is handed off to another BSC or MSC.

FIG. 3 illustrates a call that is handed over from BSC 120 to BSC 119. BSC 120 may determine that the call should be handed over because the called MS has moved to a cell that is controlled by another BSC, for example if MS 117 moved from BTS cell 123 to BTS cell 124, or because of interference in the air interface. To initiate the handover, BSC 120 sends Handover Required message 306 to MSC 104. In turn, MSC 104 sends Handover Request CR message 307 to new BSC 119. CR message 307 has a new Source Connection Reference (w) because this is a new connection for MSC 104. If BSC 119 can accept the new call connection, then it replies with Handover Request Acknowledge CC message 308, which uses a new Source Connection Reference (z) for BSC 119 and Destination Connection Reference CC 308 also comprises a Handover Reference Number (HoRef#) which identifies this handover. MSC 104 sends Handover Command DT message 309, including the Handover Reference Number, to BSC 120. At this point the MS establishes a new air interface connection with the new BSC 119. Once BSC 119 detects the new connection and determines that the connection is completed, it sends Handover Detected message 310 and Handover Completed message 311 to MSC 104.

MSC 104 and BSC 120 tear down the connection on A interface 106 by exchanging Clear messages 312, 313 and Release messages 314, 315. However, MSC 104 continues to communicate with the MS by sending additional messages, such as DT 316, via A interface 105 and BSC 119. The connection on A interface 105 is maintained until the call is handed over to another BSC, or until the parties hang up, at that time MSC 104 and BSC 119 exchange the appropriate handover and/or release messages (not shown).

Figure 4A:
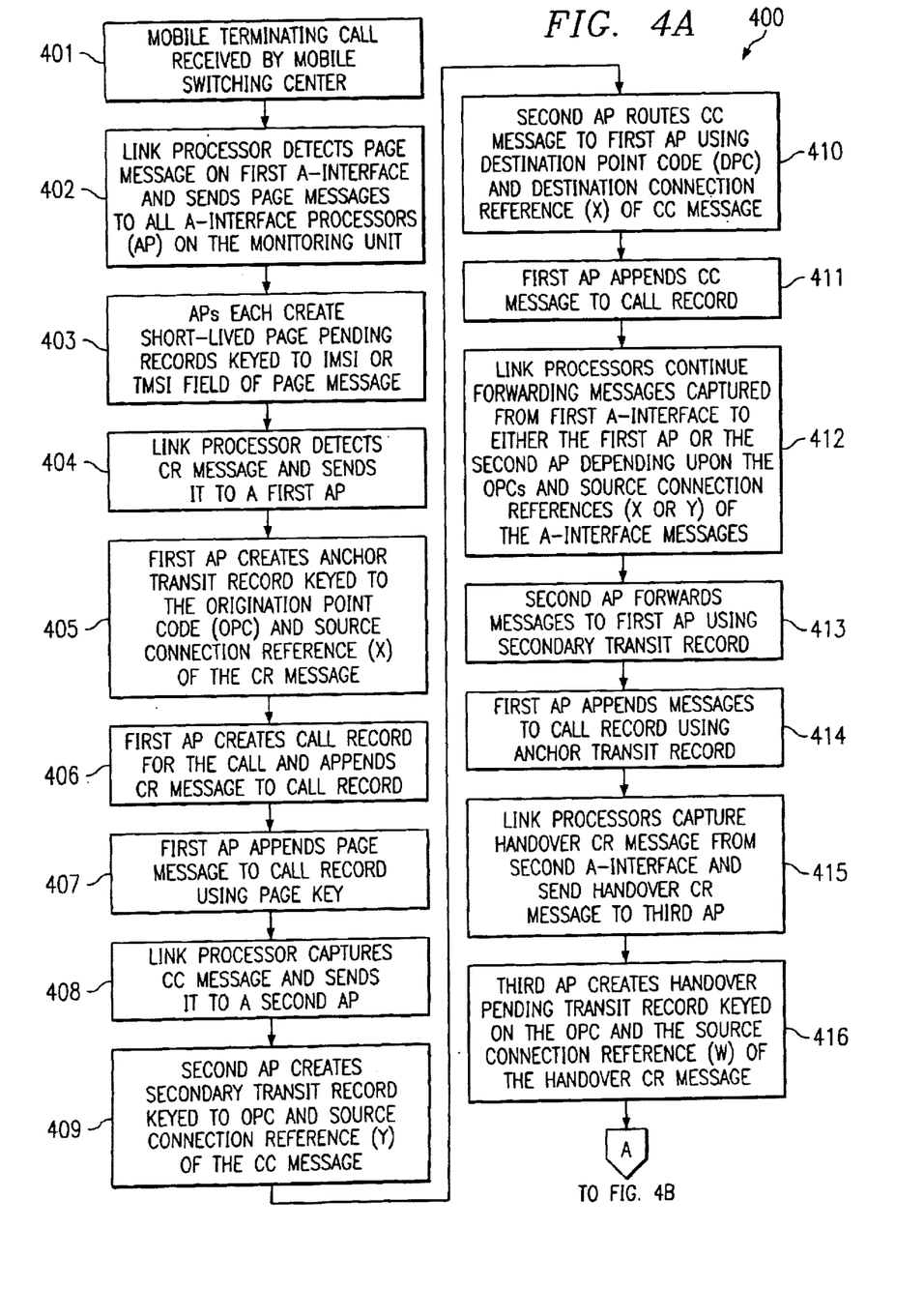
FIG. 4 is a flowchart illustrating the steps performed in one embodiment of the present invention.
Figure 4B:
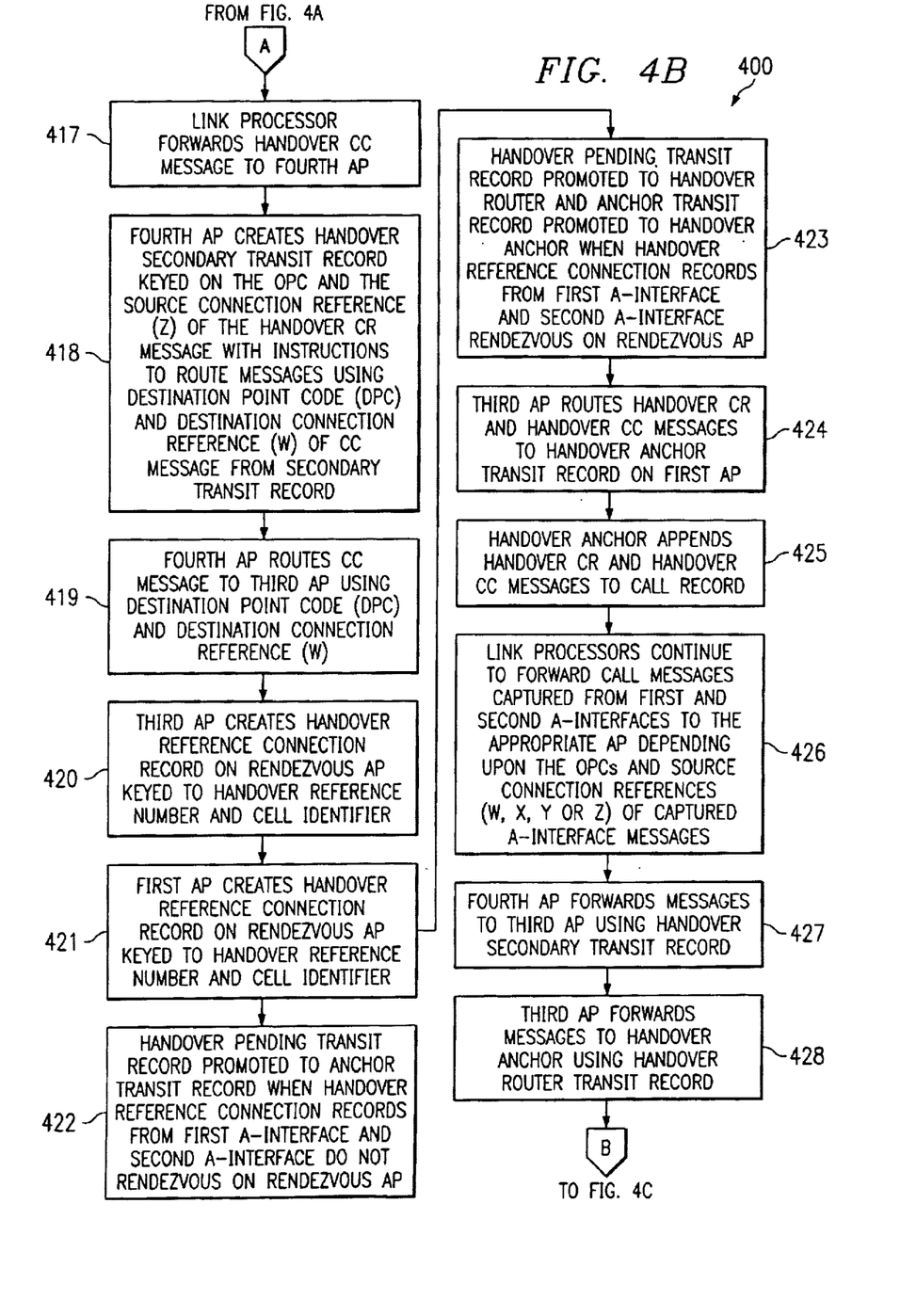
Figure 4C:
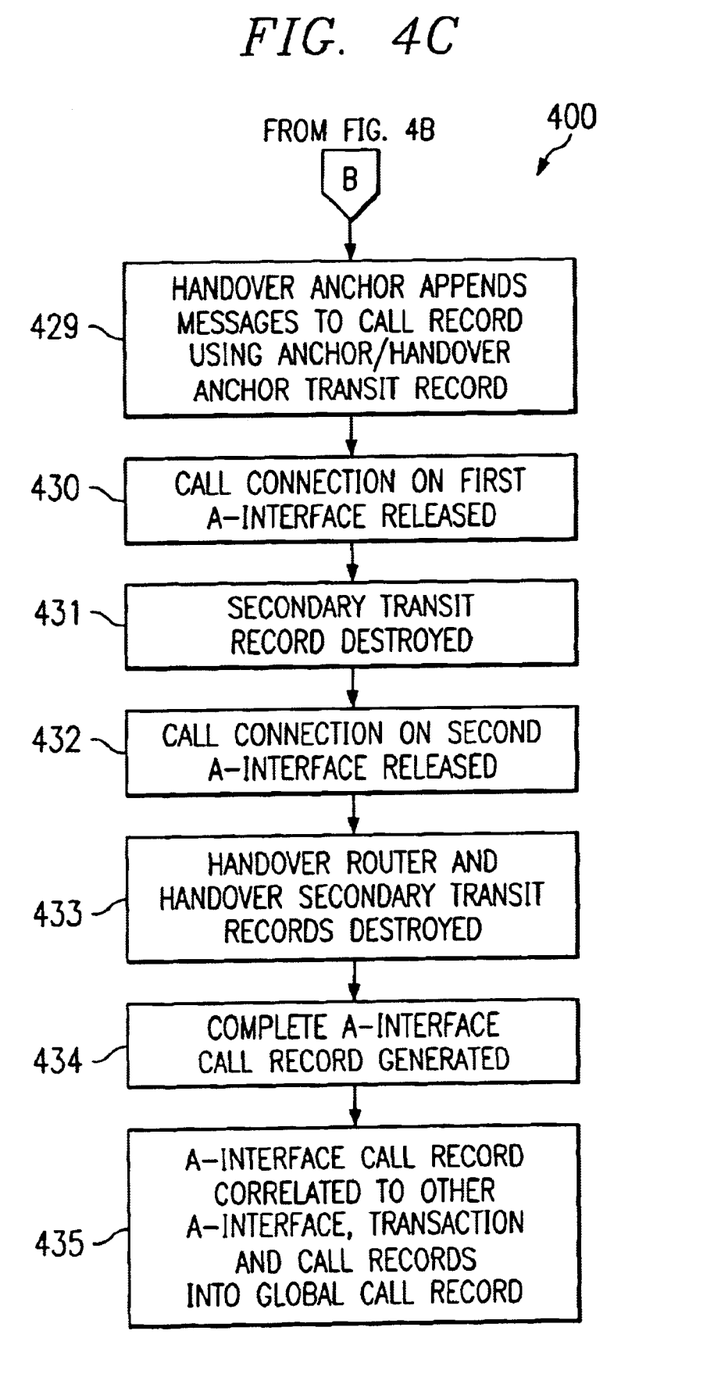

Turning now to FIG. 4, flowchart 400 shows the steps followed during a mobile call in one embodiment of the present invention. The steps illustrated in FIG. 4 correspond to a Mobile Terminating Call having messages such as those illustrated in FIG. 3. The call illustrated in FIG. 4 will be described using the network shown in FIG. 1. In step 401, Mobile Switching Center 104 receives a call for MS 117. MSC 104 transmits Page Message 301 to BSC 120 on A interface 106. In step 402, Page Message 301 is captured from link 106 by LP 12 on Monitor 101. LP 12 sends Page Message 301 to APs 15–17, which each create a Page Pending Transit Record in step 403. The Page Pending Transit Record is keyed using the IMSI or TMSI information from Page Message 301

MS 117 responds to Page Message 301 through BSC 120 by sending CR 302 to MSC 104 to establish a call connection. LP 12 detects CR 302 from A interface 106 and sends the captured CR 302 message to AP 15 (the First AP) as directed by DM 10 in step 404. In step 405, AP 15 creates an Anchor Transit Record keyed to the OPC and Source Connection Reference Number (x) for CR 302. All future messages captured by Monitor 101 during the duration of the call with an OPC and Source Connection Reference matching those of CR 302 will be forwarded to AP 15 where they will be correlated using the Anchor Transit Record. AP 15 also creates a Call Record for the call in step 406 and appends CR 302 to the Call Record by sending CR 302 to a Second Sort Queue 23 (FIG. 2).

In step 407, the Page Pending Transit Record is correlated to the Anchor Transit Record by AP 15 using the IMSI or TMSI data from CR message 302 and Page Message 301. AP 15 sends Page Message 301 to Second Sort Queue 23 to be appended to the Call Record.

MSC 104 responds to CR message 302 by sending CC message 303, which is also captured by LP 12 from A interface 106. Since CC message 303 does not have the same OPC and Source Connection Reference as CR 302, DM 10 may direct LP 12 to send CC message 303 to AP 16 (the Second AP) instead of AP 15. In a preferred embodiment, DM 10 monitors the processor load for each processor 15–18 and distributes the messages as required to maintain a balanced processing load. It will be understood that the processor load may be distributed in any number of ways depending upon the design of Monitor 101 and the capabilities of processors 15–18.

Since CC 303 has a new OPC and Source Reference Connection Number (y), a new transit record is created by AP 16. However, in step 409, AP 16 determines that CC message 303 should be associated with a CR message, so AP 16 creates a Secondary Transit Record keyed to CC 303's OPC and Source Connection Reference (y). The Secondary Transit Record directs AP 16 to route all messages having an OPC and Source Connection Reference like CC 303 to the processor associated with CC 303's DPC and Destination Connection Reference Number (x). In step 410, AP 16 routes CC message 302 to AP 15 using the alternate Connection Reference, which is the DPC and Destination Connection Reference (x). APs 15–17 can determine which AP has been assigned to process different OPCs and Source Connection Reference Numbers by querying DM 10 or APs 15–17 may maintain a table of the assigned processors.

When an AP receives a message from another AP, instead of from one of the Link Processors, the receiving AP knows to process the message using the DPC and the Destination Connection Reference (the alternate Connection Reference). Accordingly, in step 411, AP 15 matches CC 303 to the previously established Anchor Transit Record using the DPC and Destination Connection Reference (x). AP 15 then sends CC message 303 to Second Sort Queue 23 to be appended to the Call Record. As shown in step 412, while the call connection exists on A interface 106, all messages associated with the call are forwarded to either AP 15 or AP 16 based upon the OPC and Source Connection Reference Numbers in each message. These keys will be unique for the duration of the call, so any message associated with the call will have an OPC for either MSC 104 or BSC 120 and a corresponding Source Connection Reference Number of either (x) or (y). When AP 16 receives additional messages (such as DT 305) for the call, they are forwarded to AP 15 as instructed by the Secondary Transit Record in step 413.

AP 15 continues to receive direct messages, such as DT 304, from the link processors and AP forwarded messages, such as DT 305, from the secondary AP. In step 414, AP 15 determines which messages match the Anchor Transit Record and processes those messages by appending them to the Call Record.

When a handover is required, MSC 104 sends Handover CR message 307. In the case of a handover from BSC 120 to BSC 119, Handover CR message 307 is sent over A interface 105 and captured by LP 11. Handover CR message 307 has a unique OPC and Source Connection Reference Number (w) for the new MSC-BSC connection. DM 10 will instruct LP 11 to distribute Handover CR 307 to an available AP 15–17 (the Third AP). For example, Handover CR 307 may be assigned to AP 17 if it has sufficient processing capability available. In step 416, AP 17 determines that message 307 is a Handover CR and, therefore, creates a Handover Pending Transit Record keyed to Handover CR 307's OPC and Source Connection Reference Number (w).

In step 417, LP 11 captures Handover CC message 308 and forwards it to an AP, such as AP 15 (the Fourth AP). It will be understood that, depending upon the number of A interface processors available and the processing load, one processor may process all of the messages for a single call or each direction for each leg of the call may be processed on different processors. AP 15 creates a Secondary Transit Record for the Handover connection in step 418. The Handover Secondary Transit Record is keyed to the OPC/Source Connection Reference (z) of Handover CC 308. The Handover Secondary Transit Record directs AP 15 to forward all future messages with Source Connection Reference (z) based upon the alternate Source Connection Reference (w) for Handover CC 308. As additional messages are received by AP 15 in step 419, all messages related to the call are forwarded to AP 17, which is assigned Source Connection Reference (w).

Steps 420 and 421 may occur in the order shown, in reverse order or simultaneously since APs 15–17 are processing messages concurrently. In step 420, an AP monitoring messages on A interface 105 detects the handover messages and creates a Handover Reference Connection Record. In step 421, an AP monitoring messages on A interface 106 detects the handover messages and creates a separate Handover Reference Connection Record. The Handover Reference Connection Records comprise a unique Handover Reference Number for this handover and a Cell Identifier for the handover-to cell BTS. All Handover Reference Connection Records in Monitor 101 are sent to the same, predesignated AP. The Rendezvous AP may designated in any number of ways, for example, using the AP with the highest or lowest address. The Rendezvous AP processes the Handover Reference Connection Records as they are received to correlate Records having the same key. In this manner, the call connection on A interface 105 can be correlated to the call connection on A interface 106.

The Handover Reference Connection Records are short-lived. Therefore, if they are not correlated within a specified time, for example within three seconds, then the Record is destroyed. The Handover Pending Transit Record is also short-lived. However, in step 422, it is not destroyed after the time-out period, instead the Handover Pending Transit Record promotes itself to a new Anchor Transit Record if it's Handover Reference Connection Record does not rendezvous with a matching Record. This situation may occur in the case of an inter-MSC handover in which a different monitor was tracking messages for the handover-from portion of the call.

In step 423, if the Handover Reference Connection Records rendezvous, then the Handover Pending Transit Record is promoted to a Handover Router, which will forward all messages to the handover-from Anchor Transit Record (step 424). Additionally, the handover-from Anchor Transit Record is promoted to a Handover Anchor Transit Record to collect messages from the connection on both A interfaces 105 and 106. In step 425, the Handover Anchor Transit Record appends all forwarded Handover CR, CC and DT messages to the Call Record.

Both A interfaces co-exist for a period of time during handover. During this period, LPs 11 and 12 continue to forward messages to APs 15–17 as appropriate based upon the OPC and Source Connection Reference Numbers (step 426). In step 427, AP 15 continues to forward messages for the call to AP 17. In step 428, AP 17 forwards newly captured messages from LP 11 and forwarded messages from AP 15 using the Handover Router Transit Record. As a result, some messages are forwarded back to AP 15 to the Handover Anchor Record, which appends the messages to the Call Record in step 429.

Eventually, after MS 117 has established a new connection with BSC 119, the connection on A interface 106 will be released in step 430. Following release of this connection, the Secondary Transit Record is destroyed since it will no longer be needed to forward messages from A interface 106. Step 431 also prevents any future confusion if Source Connection Reference Number (y) is reused after the freezing period.

If MS 117 continues to move from one cell to another under MSC 104, then steps 415 to 431 will continued for each new handover connection. In the case of multiple handovers, there will be one Handover Anchor Transit Record and a string of two or more Handover Router Transit Records that are used to forward messages to the Handover Anchor and the Call Record. Eventually, when the call is terminated or when there is an inter-MSC handover, the connection on A interface 105 will be released in step 432 and there will be no associated Handover Reference Connection Record rendezvous. Accordingly, in step 433, the Handover Router and Handover Secondary Transit Records are destroyed after they have forwarded all remaining messages to the Handover Anchor Transit Record.

In step 435, the Handover Anchor Transit Record on AP 15 will complete the Call Record by appending all remaining messages. In step 436, the completed Call Record for MSC 104 is transmitted from Monitor 101 to Server 103 to be correlated with other MSC legs of the same call or with transaction or call records for the call. It will be understood that other monitors also forward A interface, call and transaction records to Server 103. In alternative embodiments, other devices, such a monitoring unit or dedicated processor (not shown) may be used to correlate various A interface, call and transaction records into a single Global Call Record.

A interface, call and transaction records may be correlated into a single Global Call Record using any number of methods, such as by linking specific OPCs, DPCs, Called and Calling Numbers during a particular period of time. Service providers and network operators can access such Global Call Records via Workstation 115. Server 103 is also capable of processing multiple Global Call Records to generate performance statistics for communication networks, such as the statistics discussed in application Ser. No. 09/057,940.

The A interface Call Records disclosed herein may also be used by Server 103 or Monitor 101 to generate A interface statistics such as those listed in Table 1.

TABLE 1

Number of message signaling units per service.*
Number of message signaling units octets per service.
Number of message signaling units per service per message type.
Number of message signaling unit octets per service per message type.
Number of message signaling octets per service per message type per cause.
Number of message signaling unit octets per service per message type per cause.
Number of Connections
Number of Connection Refused
Number of Connection Confirmed
Number of Handover Request
Number of Handover Complete
Number of Handover Required
Number of Handover Command
Number of Assignment TABLE 1-continued Number of Assign Complete
Number of Mobile Originating Calls
Number of Mobile Originating Setups
Number of Mobile Originating Connects
Number of Mobile Terminating Calls
Number of Mobile Terminating Setups
Number of Mobile Terminating Connects
Number of Short Calls
Number of Long Calls
Number of Max Conversation Time-outs
Handover Complete To Handover Request Ratio (per 60 min)
Handover Command To Handover Required Ratio (per 60 min)
Mobile Originating Connect To Calls Ratio (per 30 min)
Mobile Terminating Connect To Calls Ratio (per 30 min)
Handover Required Average Time (Handover Request . . . Handover Complete)
Handover Request Average Time (Handover Required . . . Handover Command)
Resource Assigned Average Time Assign . . . Assign Complete)
Mobile Originating Setup Average Time (Setup . . . Alert)
Mobile Originating Connect Average Time (Setup . . . Connect)
Mobile Originating Disconnect Average Time (Disconnect . . . Release Complete)
Mobile Terminating Setup Average Time (Setup . . . Alert)
Mobile Terminating Connect Average Time (Setup . . . Connect)
Mobile Terminating Disconnect Average Time (Disconnect . . . release Complete)
Conversation Average Time (Connect . . . Disconnect)

*Service = OMAP, BSSMAP, DTAP

Although the present invention and its advantages have been described in detail, it should be understood that various changes, substitutions and alterations can be made herein without departing from the spirit and scope of the invention as defined by the appended claims.

What is claimed is:

1. A system for correlating messages in a communication network, wherein said messages include source data identifying a specific call connection, said system comprising:

means for creating an anchor record, wherein said anchor record identifies a call record to receive messages associated with said specific call connection;

means for creating a secondary record, wherein said secondary record identifies a processor having said anchor record;

means for creating a handover pending record when a handover-to connection is initiated;

means for determining whether said handover pending record corresponds to said specific call connection; and means for converting said handover pending record to a routing record when said handover pending record corresponds to said specific call connection, wherein said routing record identifies a processor having said anchor record.

2. The system of claim 1 further comprising:

means for converting said handover pending record to a second anchor record when said handover pending record does not correspond to said specific call connection.

3. The system of claim 1 wherein said determining means further comprises:

means for creating a handover reference record for a first network link, wherein said first network link is associated with a handover-from connection;

means for creating a handover reference record for a second network link, wherein said second network link is associated with a handover-to connection; and means for comparing said handover reference records for said first and second links.

4. A method for correlating messages in a communication network, wherein said messages include source data identifying a specific call connection between a base station and a switch, said system comprising:

creating an anchor record, wherein said anchor record identifies a call record to receive messages associated with a first call connection;

creating a secondary record, wherein said secondary record identifies a processor having said anchor record;

creating a handover pending record when a handover-to call connection is initiated;

determining whether said handover pending record corresponds to said first call connection; and converting said handover pending record to a routing record when said handover pending record corresponds to said first call connection, wherein said routing record identifies a processor having said anchor record.

5. The method of claim 4 further comprising:

converting said handover pending record to a second anchor record when said handover pending record does not correspond to said specific call connection.

6. The system of claim 4 wherein said determining step further comprises:

creating a handover reference record for a first network link, wherein said first network link is associated with a handover-from connection;

creating a handover reference record for a second network link, wherein said second network link is associated with a handover-to connection; and comparing said handover reference records for said first and second links.

7. A method of correlating a connection on a first communication link to a connection on a second communication link comprising the steps of:

detecting a handover-from message on said first communication link;

creating a first handover reference record for said connection on said first link;

detecting a handover-to message on said second communication link;

creating a second handover reference record for said connection on said second link;

comparing said first and second handover reference records; and combining said first and second handover reference records into a communication record.

8. The method of claim 7 wherein said first handover reference record comprises a first cell identifier and said second handover reference record comprises a second cell identifier; and wherein said comparing step further comprises:

comparing said first and second cell identifiers.

9. The method of claim 7 wherein said first handover reference record comprises a first handover reference number and said second handover reference record comprises a second handover reference number; and wherein said comparing step further comprises:

comparing said first and second handover reference numbers.

10. A computer readable medium having a computer program stored thereon for use in a system for correlating messages in a communications network, said computer readable medium comprising:

means for correlating messages captured from a first link in said communications network and for combining said first link messages into a first call record, wherein said call record is associated with a call connection on said first link;

means for collecting messages captured from a second link in said communications network and for determining whether said second link messages correspond to said call connection on said first link; and means for collecting messages captured from a third link in said communications network and for determining whether said third link messages correspond to said call connection on said second link.

11. The computer readable medium of claim 10 further comprising:

means for combining said second link messages into said first call record.

12. The computer readable medium of claim 11 further comprising:

means for combining said second link messages into a second call record, wherein said call record corresponds to a call connection on said second link.

13. The computer readable medium of claim 12 wherein said call connection on said second link is not associated with said call connection on said first link.

14. The computer readable medium of claim 10 further comprising:

means for combining said third link messages with said call record.

15. A system for correlating a plurality of diverse messages into a single record representing a particular communication on one or more communication networks, said system comprising:

means for correlating related messages of a first type into a first message record;

means for correlating related messages of a second type into a second message record;

means for determining whether said first and second message records are associated with a single communication;

means for combining said first and second message records into a first communication record, wherein said first communication record is associated with a particular communication;

means for correlating related messages of a third type into a third message record; and means for determining whether said third message record is associated with said particular communication.

16. The system of claim 15 further comprising:

means for combining said third message record into said first communication record.

17. The system of claim 15 wherein said messages of a first type are transaction messages, and wherein said messages of a second type are call messages.

18. The system of claim 15 wherein said messages of a first type are transaction messages, and wherein said messages of a second type are A interface messages.

19. The system of claim 15 wherein said messages of a first type are A interface messages, and wherein said messages of a second type are call messages.

20. The system of claim 15 wherein said messages of a first type are captured on a first communication network and wherein said messages of a second type are captured on a second communication network, wherein said first and second communication networks carry different legs of a same communication.

21. The system of claim 15 further comprising:
means for analyzing a plurality of communication records and for generating statistics representing a status of one or more communications networks.

* * * * *